United States Patent

[11] 3,626,802

| [72] | Inventor | Bernard Halpin |
| | | 97-40 62nd Drive, Rego Park, N.Y. 11374 |
| [21] | Appl. No. | 54,676 |
| [22] | Filed | July 14, 1970 |
| [45] | Patented | Dec. 14, 1971 |

[54] CHORD CONSTRUCTION GUIDE
6 Claims, 4 Drawing Figs.

[52] U.S. Cl. .................................................. 84/478, 84/482
[51] Int. Cl. ..................................................... G09b 15/00
[50] Field of Search ......................................... 84/470–474, 477–480, 482, 485

[56] References Cited
UNITED STATES PATENTS

| 3,185,016 | 5/1965 | Stinson, Jr. et al. | 84/478 |
| 2,958,251 | 11/1960 | Calabro | 84/477 |
| 3,001,435 | 9/1961 | Duffy et al. | 84/474 |
| 2,517,026 | 8/1950 | Quednau | 84/478 |
| 2,675,731 | 4/1954 | Ruben | 84/478 |

FOREIGN PATENTS

| 259,802 | 1913 | Germany | 84/472 |

*Primary Examiner*—Richard B. Wilkinson
*Assistant Examiner*—John F. Gonzales
*Attorney*—Popper, Bain, Bobis & Gilfillan ABSTRACT: A chord construction guide, i.e., a training aid for use in teaching musical keys and their associated chords and for displaying and placing the same into close association with the keys on an instrument having standard keyboard spacing is disclosed including, a display means having a graphic presentation thereon of various musical keys, the notes associated with each key in predetermined spaced relation and indicating the combination of notes to form chords in each particular key illustrated, a container for containing the display means in such a manner as to permit viewing of the display means therethrough, and a support means for rotatably supporting the container in close proximity to the keyboard with which it is associated, so that the particular chords for any given key are available adjacent the fingertips of the user by mere rotation of the container to present selective portions of the display means to the person using the chord construction guide.

Patented Dec. 14, 1971

BERNARD HALPIN
INVENTOR.

BY Popper, Bain, Bobro & Gilfillan
Attys

Patented Dec. 14, 1971

BERNARD HALPIN.
INVENTOR.

BY Popper, Bain, Bobis & Gilfillan
Attys

FIG 4

CHORD CONSTRUCTION GUIDE

BACKGROUND OF THE INVENTION

The development of the musical talents of any student of music involves the exercise and development of his physical capabilities so as to enable him to translate written music or his own ideas into pleasing musical sounds, and the development of his intellectual understanding of music itself, including keys, notes and combinations of notes to form chords.

As is recognized by most musical instructors, the development of the physical capabilities of a student is a function of the amount of time that the student practices as limited only by the extent of his physical capabilities. The understanding of keys, notes and chords, however, is dependent upon the exposure of the student to these concepts and his ability to form a mental understanding of the relationship of the keys, notes and chords with respect to the keyboard on which he will play the same.

It is well known in the educational field that the teaching of relationships and fundamental concepts is enhanced by the use of visual aids, and this holds true in the field of musical education. Specifically, it has been found that the use of visual aids in the teaching of keys, notes and combinations of notes to form chords is expedited by using devices to visually present these relationships to a student.

Many such devices are known and have been utilized over the years by musical instructors. For the most part, however, they have been complicated, expensive and thus not generally available to the average student as a device for facilitating home study.

It is the principal object of the invention therefore to provide a musical training aid in the nature of a chord construction guide which is useful to assist a music student to grasp or to learn unassisted the concepts of keys and the interrelation of the notes to form the numerous chords of a particular key and to play the same with correct fingering, which chord construction guide is of sufficient simplicity and sufficiently inexpensive to make it attractive and available more particularly to the neophyte musical student yet adaptable for use by other musicians and can be easily mounted on the keyboard to be used adjacent the fingertips of the musician using the device and in assembled position adaptable to be indexed so as to bring into view on a single line extensive information regarding the chords for a particular key as may be required by the person using the device.

SUMMARY OF THE INVENTION

The foregoing principal object and other objects not enumerated are achieved by the chord construction guide of the present invention, one embodiment of which may include a display means having thereon a graphic presentation of musical keys with the notes associated with each key in predetermined spaced relation, a container means for containing the display means such as to permit viewing of the display means, and support means for rotatably supporting the container means so as to provide for the selective presentation of portions of the display means when the guide is in assembled position on a keyboard.

BRIEF DESCRIPTION OF THE DRAWINGS

A more complete understanding of the present invention may be had from the following detailed description thereof, particularly when read in light of the accompanying drawings wherein:

FIG. 4 is a plan view of the display means of the invention showing thereon a graphic presentation of musical keys and the notes and chords associated with each key.

DETAILED DESCRIPTION

Figure 1:
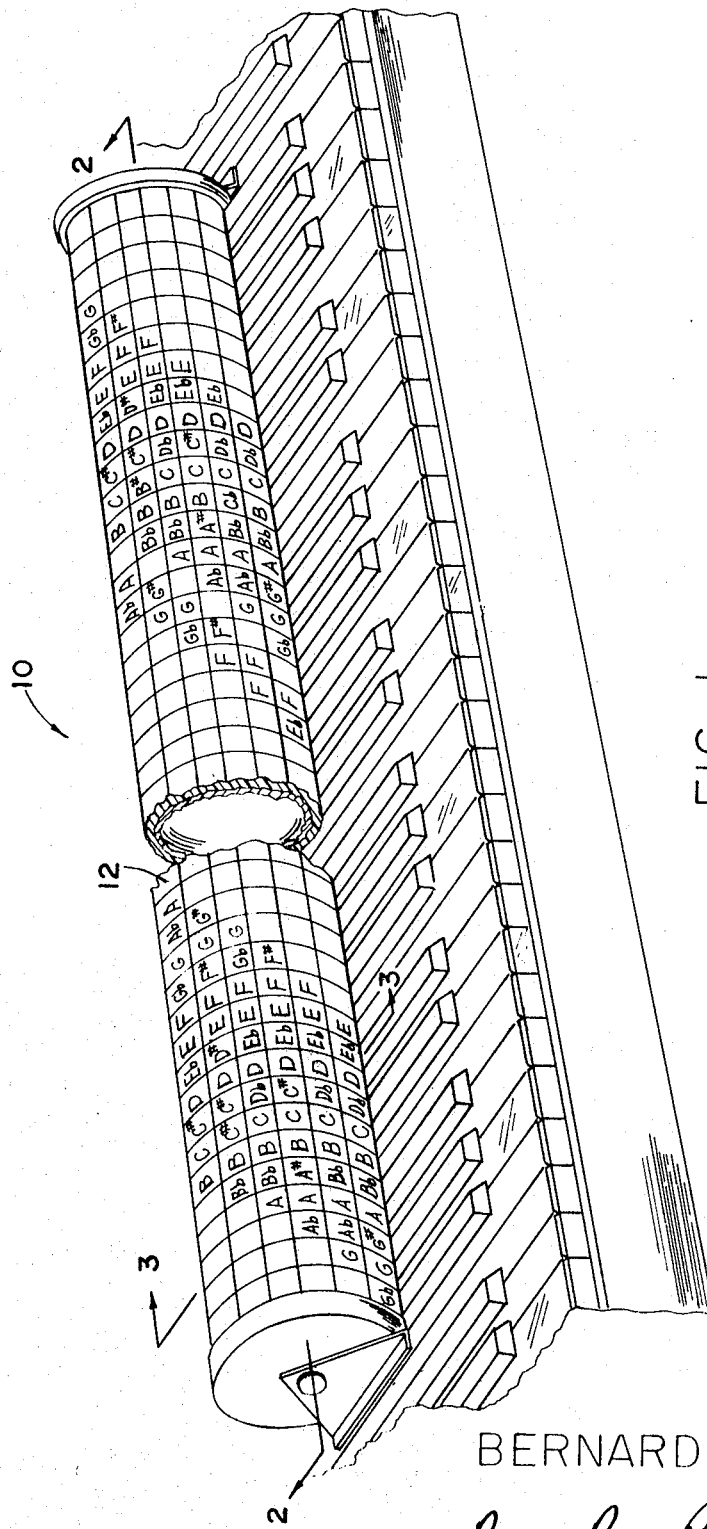
FIG. 1 is a perspective view, partially cut away, of a chord construction guide in combination with a piano keyboard according to the invention.
Figure 2:
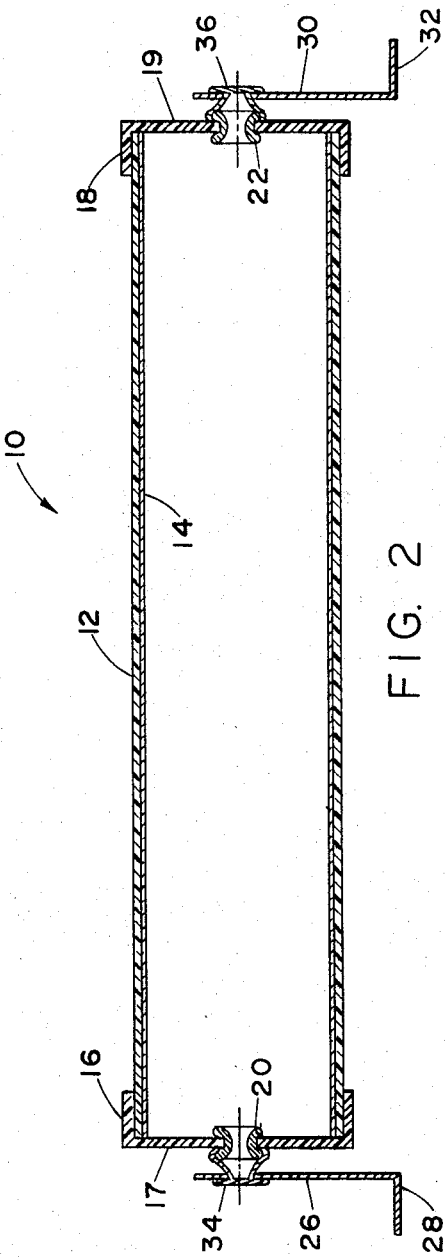
FIG. 2 is a cross-sectional, elevational view through the plane 2—2 of FIG. 1.
Figure 3:
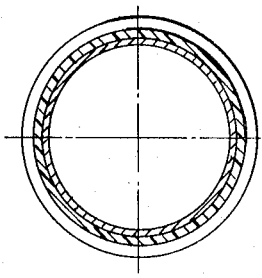
FIG. 3 is a cross-sectional, elevational view through the plane 3—3 of FIG. 1.

Referring therefor to the drawings, and in particular to FIGS. 1-3, a chord construction guide according to the present invention is designated generally by the reference numeral 10 and shown in combination with a piano keyboard 11.

Chord construction guide 10 comprises an elongated cylinder 12 which defines a container means for containing a display device 14, the nature of which is discussed in detail below. Elongated cylinder 12 is preferably manufactured of a clear material such as a clear plastic or the like.

One end of elongated cylinder 12 is covered and closed by a first end cap 16, and the other end of elongated cylinder 12 is similarly covered and closed by a second end cap 18. End caps 16 and 18 are cup-shaped structures each having a cylindrical wall portion and each having an end portion 17 and 19 respectively. The end caps 16 and 18 are detachably mounted on the ends of elongated cylinder 12 to permit the insertion and removal of a display device 14 having the desired information thereon.

Rigidly mounted in the center of end portions 17 and 19 are the male elements 20, 22 of a pair of snap fasteners. The elements 20, 22 can be swage fitted as shown in FIG. 2, or each can be secured by a nut and bolt as is well known in the art. Elements 20 and 22 are received in suitable apertures formed in end portions 17 and 19, respectively, and are positioned coaxial with the longitudinal axis of elongated cylinder 12.

Elongated cylinder 12, display device 14 and the first and second end caps cooperate, when assembled as shown, to define a display section which is rotatably mounted as is discussed below to permit selective viewing of various portions of the display device 14 by a viewer.

Disposed adjacent first end cap 16 is a first support element which comprises a triangular section 26 extending normal to the longitudinal axis of elongated cylinder 12 and a footing section 28. Similarly, adjacent second end cap 18 is disposed a second support element having a vertically extending triangular section 30 and a footing section 32.

Rigidly secured within suitable openings in the triangular sections 26 and 30 of first and second support sections, respectively, are snap fastener female elements 34 and 36 which cooperate with the male elements 20 and 22 mounted in end cap end portions 17 and 19 to rotatably mount the display section of the apparatus on support elements 26 and 30. Thus, when snap fastener sections 34 and 36 are in engagement with snap fastener sections 20 and 22, and when footings 28 and 32 of support elements 26 and 30 are positioned on a suitable support means, the display section may be rotated to present portions of the display device as may be desired by a viewer.

The support elements may be manufactured of any suitable material such as sheet metal, plastic or the like. Additionally, the first and second end caps may be manufactured from suitable material such as plastic by any of the conventional processes such as molding, stamping or the like.

Figure 4:
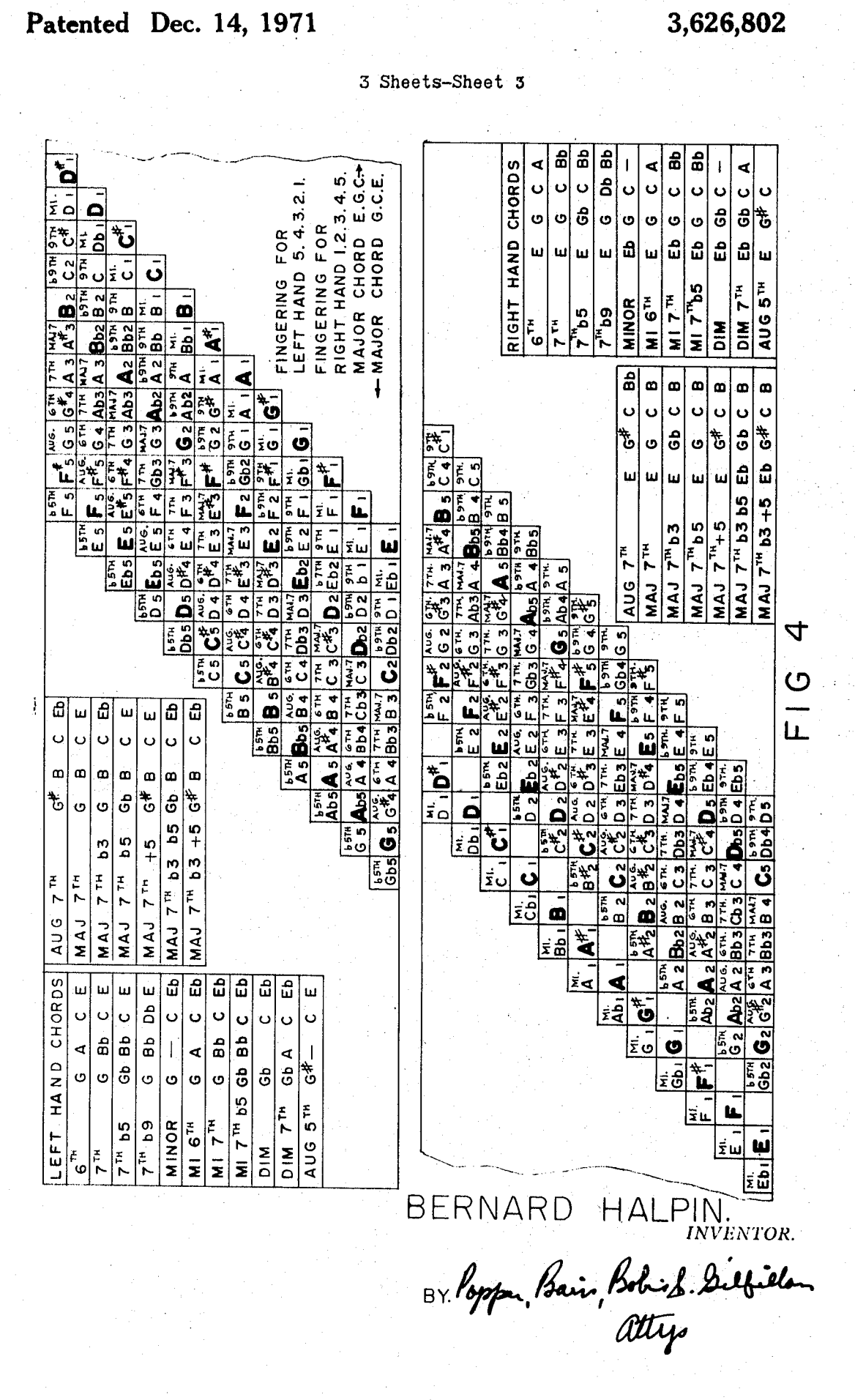

Referring to FIG. 4, display device 14 can be seen to comprise a sheet of suitable material, such as display paper, the length of which is substantially equal to the length of elongated cylinder 12 and the width of which is substantially equal to the circumference of the inner surface of elongated cylinder 12. Thus, when display device 14 is rolled to cylindrical configuration to be received within elongated cylinder 12, the surface of the display device 14 is in surface-to-surface engagement with the inner surface of elongated surface 12 throughout substantially its entire inner circumference.

Considering one preferred form of graphic display provided on display device 14, the display can be seen to include a left-hand set of longitudinally extending bar graphs and a right-hand set of longitudinally extending bar graphs. The left-hand set of bar graphs in the embodiment of display device shown is constructed to define the keys, the physical notes in predetermined spaced relation, the chord relationships which are appropriate for the left hand and the fingering required in playing a standard piano keyboard. Similarly, the right hand set of bar graphs is constructed to provide the keys, notes, the chords and the fingering for the notes of each particular chord required for the right hand in playing a standard piano keyboard. Thus, there is provided for each set of bar graphs 12 longitudinally extending, vertically adjacent bars corresponding to the major accepted musical keys of C, $D_b$, D, $E_b$, E, F, F#, G, $A_b$, A, $B_b$, B. Each bar is of sufficient width to define an arc of 30° around the longitudinal axis of elongated cylinder 12 when the display device is rolled into a cylindrical configuration and placed within elongated cylinder 12. In addition to the division of each set of bar graphs into 12 vertically adjacent display bars, each display bar is divided into 11 sections, each section corresponding to a particular musical note and being of a width to permit registry of each section with a corresponding note on keyboard 11. Thus, for each bar which represents a particular musical key, there is presented on the graphic display each of the notes of a complete scale. Further, with respect to each key, the notes are annotated to indicate when they are to be utilized in constructing a particular chord and the proper fingering to be used for such chord.

Considering initially the key of C which is presented in the lowermost display bar in each set of bar graphs, it can be seen that the major chord for the key of C will include the notes G, C and E (those notes in heavy print). Similarly, for the E minor chord, it can be seen that the basic E of the major chord is changed to an $E_b$ as is indicated by the designation Mi. above the $E_b$ key. Further, it can be seen that the minor seventh chord would include the basic minor chord, including the notes G, C and $E_b$, as well as the seventh note which in this key is $B_b$. Thus, as is evident from FIG. 4, the graphic presentation of the keys, notes and chords is available for the 12 principal keys, as well as all of the principal chords which may be utilized with the 12 principal keys.

The right hand section of the graphic display as shown in FIG. 4 is structured exactly the same as that of the left hand section with the exception of the particular starting points for the scale notes. In this regard, the starting points (i.e., the extreme leftward notes) for the key of C can be seen to be $G_b$ on the left hand section and $E_b$ on the right hand section. This, however, is not a structural difference, but rather an accommodation for the difference in the ordinary positioning of the hands when playing a standard piano keyboard.

It is important to note that each of the note sections of the bar is provided with a number, the numbers ranging from 1 through 5. These numbers represent the fingers on the hand of the player, i.e. No. 1 indicating the thumb, No. 2 indicating the index finger, No. 3 indicating the middle finger, No. 4 indicating the ring finger and No. 5 indicating the small finger. Thus, in addition to identifying the keys, notes and chords, the particular embodiment of display device as shown also identifies the proper finger which should be utilized on a standard piano keyboard for depressing the key of the piano to play the proper note.

The display device shown in the illustrated embodiment of the invention above described represents one of three inversions that can be used. Accordingly, it will be understood that varying forms of musical notation can be shown on a particular display device and that the use of such variant form in the place of the one illustrated herein is not outside the scope of the present invention as will be understood by those skilled in the musical arts and teaching devices of this type.

The chord construction guide of the invention may be manufactured from other materials than those suggested above. Additionally, display devices adapted for the use of the chord construction guide with other instruments may also be provided. The fundamental relationship between the keys, notes and chords, however, will remain the same no matter what the basic instrument. Thus, the chord construction guide of the present invention has broad scope usage in the musical education field.

In view of the foregoing, it is considered to be evident that the chord construction guide of the present invention provides an inexpensive, simple and efficient device for assisting a music teacher in teaching the music student the basic relationships among keys, notes and chords. Further, because of the basically simple nature of the invention, it is considered to be manifest that many changes to the basic structure may be accomplished without departing from the scope of the invention.

I claim:

1. A chord construction guide for use in teaching musical keys and their associated notes and chords and adapted for association with the keyboard of a piano comprising;
   an elongated substantially transparent hollow cylindrical container means;
   means for rotatably supporting said container means including, a connecting means cooperatively disposed at each end of the container means;
   display means having a graphic presentation of musical keys and the notes associated with said keys wherein the notes for each key extend along the same longitudinal line of the container means in the form of a left bar graph for notes of a given key to be played by the left hand and a right bar graph for notes of the same given key to be played by the right hand;
   said display means confined in contact with the inner surface of the container means and visible therethrough in assembled position at all rotatable positions of said container means; and the graphic presentation of the musical keys on the display means in predetermined spaced relation for permitting selective viewing and orientation of the respective right bar graph and left bar graph of a given key on rotation of the container means.

2. In a chord construction guide as claimed in claim 1 wherein the connecting means includes:
   a first end cap at one end of the container means;
   a second end cap at the other end of the construction means;
   a first support element rotatably attached to said first end cap,
   and a second support element rotatably attached to said second end cap.

3. In a chord construction guide as claimed in claim 2 wherein the rotatable means for attaching the first support element and the second support element to the first end cap and second end cap are respectively snap fastener means.

4. In a chord construction guide as claimed in claim 1 wherein said left bar graph and said right bar graph are respectively divided into sections and each section corresponds to a musical note in the key associated with the respective left bar graph and right bar graph, and said sections having operating indicia including fingering and chord symbols.

5. In a chord construction guide as claimed in claim 4 wherein each of the left bar graphs and each of the right bar graphs on the graphic presentation of the display means subtend an angle of about 30° on the visible circumferential face of the container means.

6. The combination of a chord construction guide as claimed in claim 1 with a piano having a keyboard with key members thereon in spaced relation to each other, said support means to permit movably mounting the chord construction guide on the keyboard in proximate relation to the key members to bring the sections of the left bar graph and right bar graph into substantial orientation with the corresponding associated keys of the keyboard at all positions of rotation of said chord construction guide.

* * * * *